United States Patent [19]
Street et al.

[11] Patent Number: 5,462,316
[45] Date of Patent: Oct. 31, 1995

[54] QUICK ACTION FLUID COUPLING

[75] Inventors: David G. Street, Pottstown; Thomas J. Paff, Valley Forge; Dean A. Thomas, Boyertown; Joseph P. McGlynn, Glen Mills, all of Pa.

[73] Assignee: Campbell Fittings, Inc., Boyertown, Pa.

[21] Appl. No.: 246,117

[22] Filed: May 19, 1994

[51] Int. Cl.⁶ .............................. F16L 37/23; F16L 35/00
[52] U.S. Cl. ................... 285/81; 285/316; 285/80
[58] Field of Search .................... 251/149.6, 89, 251/96; 137/383, 614.02, 614.04, 614.05, 614.06; 285/313, 314, 315, 316, 80, 81

[56] References Cited

U.S. PATENT DOCUMENTS

| | | | |
|---|---|---|---|
| 2,860,893 | 11/1958 | Clark | 285/316 |
| 3,028,179 | 4/1962 | Abramoska | 285/81 |
| 3,359,015 | 12/1967 | Zahuranec | 285/316 |
| 3,420,497 | 1/1967 | Wilcox | 285/316 |
| 4,213,482 | 7/1980 | Gondek | 285/316 |
| 4,527,816 | 7/1985 | Bresie et al. | 285/81 |
| 4,776,614 | 10/1988 | Marrison et al. | 285/316 |
| 4,924,909 | 5/1990 | Wilcox | 137/614.05 |
| 5,066,049 | 11/1991 | Staples | 285/316 |
| 5,076,324 | 12/1991 | Herman et al. | 137/614.06 |
| 5,076,325 | 12/1991 | Ekman | 137/614.03 |
| 5,092,364 | 3/1992 | Mullins | 137/614.05 |
| 5,161,568 | 11/1992 | Turvey | 251/96 |
| 5,230,538 | 7/1993 | Kobayashi | 285/316 |
| 5,255,714 | 10/1993 | Mullins | 137/614.04 |

FOREIGN PATENT DOCUMENTS 2653975  6/1978  Germany ................ 285/81

OTHER PUBLICATIONS

Amflo "Couplers & Plugs" (undated catalogue page—p. 4).
Flo–Couplings, Inc. (undated catalogue page—1 page).
Snaplock Spare Parts (action hose couplings from England) (undated catalogue page—1 page).
Cam and Groove (by Dixon Valve & Coupling Company) "Boss–Lock" Cam & Groove (undated catalogue page—p. 11).
Dixon Valve & Coupling Company "Andrews" Lockable Dust Caps (undated catalogue page—p. 19).
Ever–Tite Coupling Products A Morris Coupling Company (undated catalogue page—p. 19).
Safety Couplings, Valved Couplings (Ever–Tite A Morris Coupling Company) "No. 102 shakeproof coupler" (undated catalogue page—p. 6).
Campbell Marketing, Inc. "Hose Fittings for Industry" (undated catalogue in its entirety).
Foster Index and Quick Detachable Couplers (undated catalogue pages—cover page and p. 1).
Keen Manufacturing Inc. "Safety Lockout Products" (undated catalogue pages—2 pages).

*Primary Examiner*—Eric K. Nicholson
*Attorney, Agent, or Firm*—Synnestvedt & Lechner

[57] ABSTRACT

A quick action coupling is provided of male and female coupling parts in which spherical camming members are loosely retained in a multiplicity of circumferentially disposed openings extended radially through the wall portion of the female coupling member. An axially movable collar surrounding the cylindrical wall portion of the female coupling member has an internally disposed camming surface portion which is configured to cam the spherical members radially inwardly upon movement of the collar in the direction of the open end of the coupling member. The male coupling member is provided with an annular end portion interfacing with a compressible sealing ring in the female coupling portion and further has an upwardly open groove disposed in alignment with the spherical members when the end surface portion is in interfacing relationship with the sealing ring. Pushing the collar axially towards the open end of the female member applies a camming force on the spherical members which first locks the spherical members within the circumferentially disposed grooves and then forces the end portion of the male member axially so as to effect a compression of the sealing ring. A ring having detent recesses is rotatably mounted on the female coupling member for movement to a position in which detent pins on the collar interfit with the detent recesses. Locking means are disclosed to block movement to the uncoupled position.

18 Claims, 5 Drawing Sheets fig.1.

QUICK ACTION FLUID COUPLING

FIELD OF THE INVENTION

This invention relates to quick action fluid couplings and more particularly to improvements in quick action couplings of the cam-locking type.

BACKGROUND OF THE INVENTION

Quick action couplings of the cam-locking type have been in use for many years for the purpose of interconnecting pipes, hoses and other conduits used for the purpose of conveying liquids and dry bulk products under low to medium pressures. The conventional coupling of this type, as described in military standard MIL-C-27487 comprises a female coupling member on which a pair of cam arms are pivotally mounted in openings extending through the coupling wall. The cam arms have camming surfaces which project through the openings and are adapted to interengage with a groove of arcuate cross-section in an interfitting male coupling member. In an initial position in which the male coupling member is inserted into the female coupling member, the cam arms are held so that they project radially outwardly from the coupling allowing clearance for the male coupling member to be inserted, which is accomplished by moving the female coupling member towards and over the male coupling member. As the female coupling member is pushed towards the male coupling member, the cam arms are drawn in the opposite direction towards the worker until they ultimately extend parallel to the axis of the coupling. This draws the male coupling member further into the female coupling member compressing a compressible sealing ring against an annular shoulder within the female coupling member, thereby effecting a seal.

Several difficulties are encountered in the use of this type of coupling assembly. Interconnecting the coupling parts requires that the worker exert a force on the female coupling member towards the male coupling member and while maintaining this force, apply a force to the cam arms in the opposite direction to effect a locking of the coupling parts in place. In practice, particularly with the larger sizes of couplings, this is not always easy to do, especially in very cold weather when a workman is wearing heavy gloves. Considerable jockeying of the female member is often required to align the cam surfaces within the groove. If not properly aligned and the workman attempts to force the cam arms to the locking position, there is a likelihood that one or both cam arms will become bent or even broken. In addition to the foregoing, the cam arms are often subject to breaking or bending when the parts are uncoupled and the cam arms not securely fastened. Once bent, replacement of the cam arms is the only option available.

Other types of couplings of the quick action type are known, which involve the use of spheres carried in openings extending through the wall of the female coupling member. A locking sleeve or collar is spring loaded into a position in which the balls are held so that they interfit in a recess in the outer periphery of the male coupling member. In known couplings of this type, sealing is accomplished by a spring-loaded gasket or sealing ring. The spheres do not act to draw the male coupling member into engagement with the seal. They do not contribute to the sealing force and only serve as locking members.

SUMMARY AND OBJECTS OF THE INVENTION

According to the invention, a quick action coupling is provided comprising male and female coupling parts in which camming members which are preferably spherical are loosely retained in a plurality of circumferentially exposed openings extended radially through the wall portion of the female coupling member. An axially movable collar surrounding the cylindrical wall portion of the female coupling member has an internally disposed camming surface portion which is configured to cam the spherical members radially inwardly upon movement of the collar in the direction of the open end of the coupling member. The male coupling member is provided with an annular end portion interfacing with a compressible sealing ring in the female coupling portion and further has an upwardly open groove disposed in alignment with the spherical members when the end surface portion is in interfacing relationship with the sealing ring. Pushing the collar axially towards the open end of the female member applies a camming force on the spherical members which first locks the spherical members within the circumferentially disposed groove and then forces the end portion of the male member axially so as to effect a compression of the sealing ring. Means are provided for retaining the collar in the position in which a seal is effected which preferably comprises a resiliently held detent. Optionally locking means may be provided to prevent uncoupling, except by authorized workers.

An important object of the invention is the provision of a coupling assembly in which the force vectors applied to effect coupling and the establishment of a pressurized seal extend in the same direction.

Another object of the invention is the provision of a quick action coupling in which the use of cam arms for effecting coupling is eliminated.

A further object of the invention is the provision of a quick action coupling in which the coupling action is simplified and less force is required to effect both coupling and uncoupling.

A still further object of the invention is the provision of a quick action coupling which will withstand higher pressures than the conventional cam-arm type couplings.

Another object of the invention is the provision of a cam actuated, quick action coupling which is less prone to damage and breakage.

A still further object of the invention is the provision of a coupling in which wear and tear on the coupling is reduced by the elimination of failure prone parts and improved distribution of wear points.

DETAILED DESCRIPTION OF THE PREFERRED EMBODIMENT OF THE INVENTION

With reference first to FIGS. 1–8, a preferred form of cam lock coupling constructed in accordance with principles of the invention comprises a male coupling member or adapter 11 and a female coupling member generally indicated by the reference character 12. Male coupling member 11 is in the form called for in MS27019 and has an external wall portion 13 of substantially circular cross-section in which a circumferentially extending, substantially arcuate recess 14 is formed. The male coupling member further has a tapered end 15 and an end face 16 which is adapted to interface with a compressible gasket or sealing ring 17 within the female coupling member, as will be described hereinafter.

The male coupling member 11 is further provided with any suitable means for attachment to a pipe or hose. For illustrative purposes, the male coupling member is internally threaded, as shown at 18.

Figure 1:
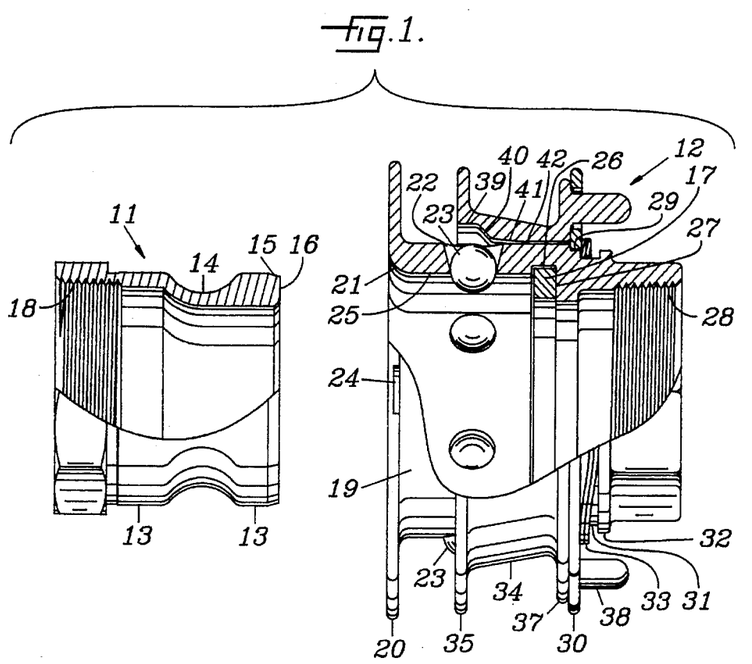
FIG. 1 is an overall view, partly in section, showing male and female coupling elements formed in accordance with the invention.

Female coupling member 12 is comprised of a body portion 19 which is substantially cylindrical in cross-section and defines an axially extending bore or passageway 25. A ring-shaped flange 20 having an annular radius 21 facilitates insertion of the male coupler member. The outside circumferential surface of ring 20 preferably extends beyond the surface of other parts, to be described hereinafter, and serves to prevent accidental uncoupling and to protect the parts against damage should the female coupler member be dropped or knocked against a hard surface. Preferably, the ring 20 has a multiplicity of radially extending cutouts 24, one of which is shown in FIG. 1, whose purpose will be described hereinafter.

The wall portion 19 is further provided with a series of spaced openings 22 which are preferably equidistantly and circumferentially disposed on a line extended around the body portion. The openings 22 loosely retain camming members 23 which are preferably of spherical shape and free to rotate, and for this purpose, the openings should be conically shaped with each spherically-shaped camming member being retained so that slightly less than ½ of its diameter extends into passageway 25.

Figure 2:
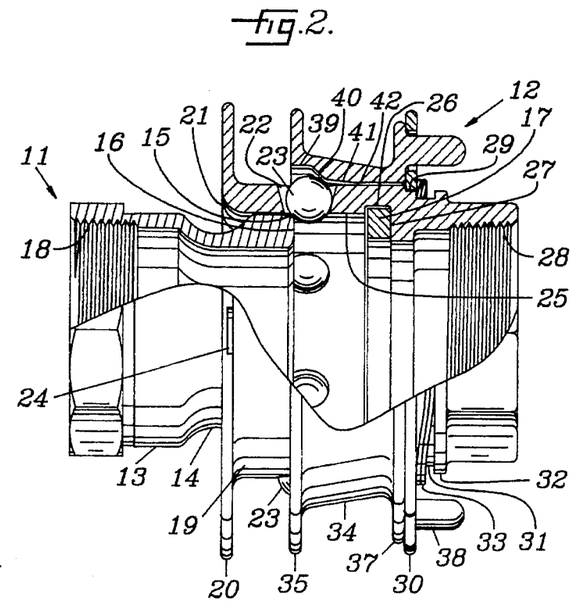
FIG. 2 is a view similar to FIG. 1 in which the male coupling element is in the process of being inserted into the female coupling element.
Figure 3:
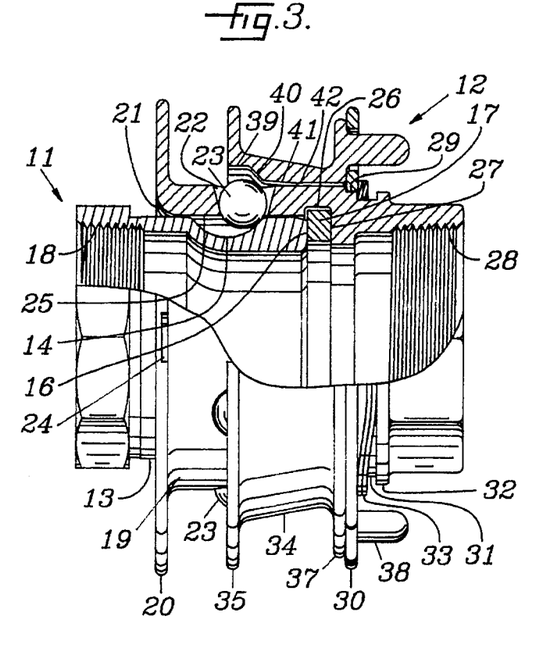
FIG. 3 shows the coupling elements with the end surface of the male coupling member in interfacing relationship with the compressible sealing ring within the female coupling member.
Figure 4:
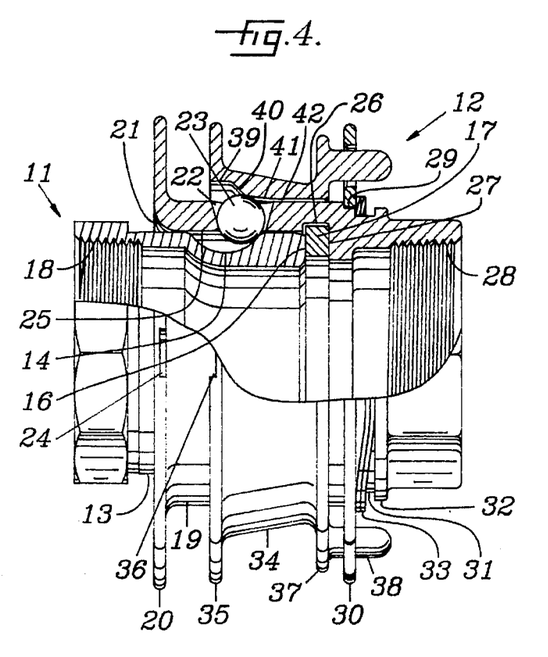
FIG. 4 is a view similar to FIG. 3 illustrating the position of the camming portion of the locking collar as the collar is shifted towards the open end/of the female coupling member.

The inside diameter of body 19 is dimensioned to allow insertion of the male coupling member 11, the initial phase of insertion being illustrated in FIG. 2. As can be seen in the drawings, the bore 25 is further provided with a circumferentially extending groove 26 in which compressible sealing ring or gasket 17 is seated. A shoulder 27 supports the gasket against axial movement and provides a sealing surface for the gasket when the coupling parts are interconnected. The female coupling member 12 is further provided with means such as threads or other connecting provisions for attachment to a pipe, hose or the like. Wrenching surfaces are typically provided on both the male and female coupling member and the portions located exteriorly of the threaded portion 18 and 28.

The body portion is further provided with an external circumferential groove 29 which receives a safety ring 30, whose purpose is described hereinafter. A spring retainer of the wave type urges ring 30 towards the left, as viewed in FIGS. 1 and 2.

As can be seen in FIGS. 1–8, an axially rotatably movable collar 34 is mounted exteriorly of cylindrical body portion 19 of female coupling member 12. Collar 34, in preferred form, has a radially extending flange 35 at one end of a diameter less than the diameter of ring 20. A plurality of radially extending circumferentially disposed cutouts 36, shown in FIGS. 5–8, are provided for purposes to be described hereinafter. The opposite end of collar 34 is provided with a ring or circular flange 37 which interfaces with flange 30 when the collar is in the disconnect position. Preferably, collar 34 is provided with a plurality of axially extending pins 38 which project through openings 44 in ring 30 when the collar is in the disconnect position.

As is shown in FIGS. 1–8, collar 34 has an internal configuration which comprises an initial annular recess 39 within which the spherical elements are loosely captured when the collar is in the open or disconnect position. Immediately following the initial recess portion 39, the collar is provided with a relatively steep camming ramp portion 40 and a following camming ramp portion 41 which has a relatively gradual slope. Immediately following the ramp portion 41, the collar is provided with a ramp portion 42 which gradually slopes in the reverse direction with respect to ramp portions 40 and 41. As can be seen with reference to FIGS. 1–5, movement of the collar towards the left as viewed in these figures initially effects a relatively large inward movement of the spherical members 23, moving them into the circular recess of the male coupler 11; thereafter, ramp 41 effects a relatively smaller amount of inward motion of the spherical members, thereby applying axial pressure on the side of the circular recess 14 which is effective to force the male coupler element 11 axially into the female coupler element 12 so as to compress gasket 17. In the preferred embodiment of the invention, camming ramp portion 42 thereafter allows the spherical elements 23 to retract slightly effecting a degree of relief of the compression on the gasket 17. The arrangement provides a toggle effect to the collar 34 signalling to the worker that a seal has been established. The arrangement further requires a deliberate application of a force to overcome the toggle effect when disconnecting the coupling parts.

Figure 9:
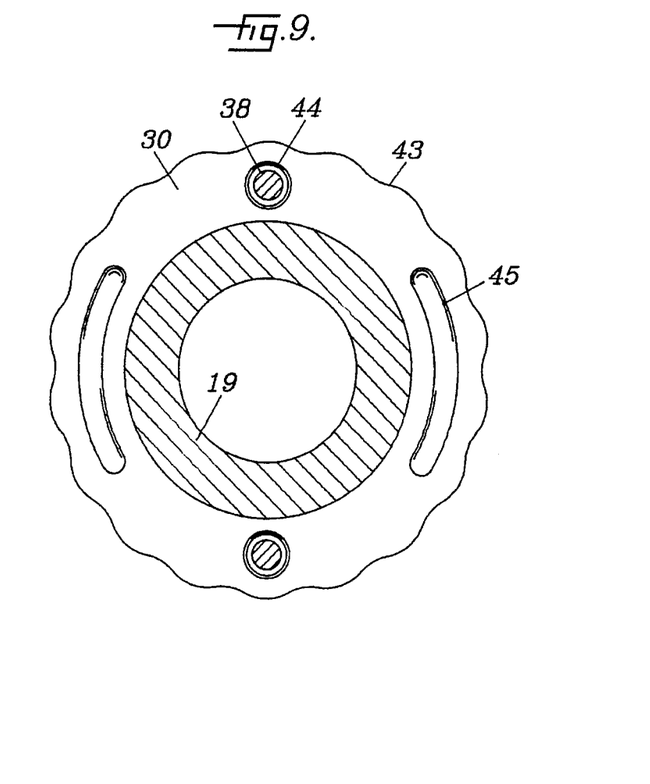
FIG. 9 is a sectional view taken along line 9—9 of FIG. 5.
Figure 10:
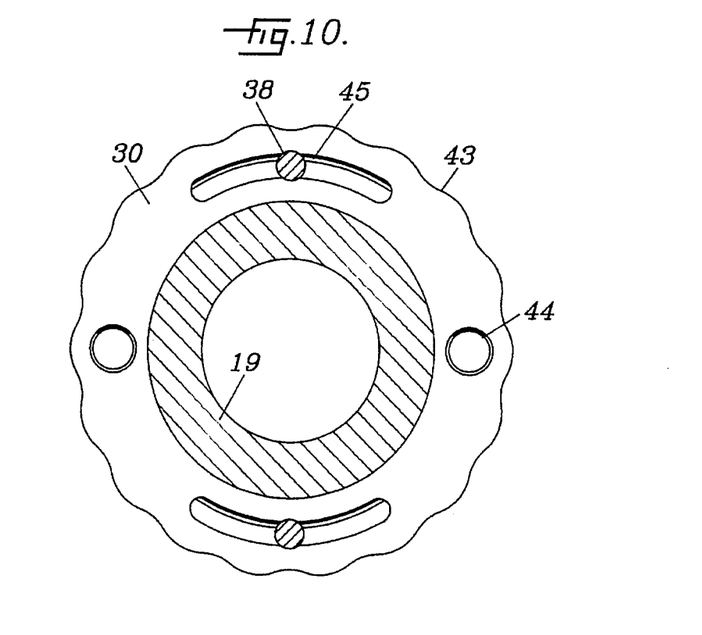
FIG. 10 is a sectional view taken along line 10—10 of FIG. 7.

With reference to FIGS. 9 and 10, it can be seen that ring 30 is preferably provided with an undulating periphery 43 which is easily gripped in order to facilitate ease of turning. The inside diameter of ring 30 slidably fits within the groove 29, as indicated above, and as can be seen by a comparison of FIGS. 5 and 6. As noted above, the ring 30 has a plurality of openings 44 which are preferably chamfered and are sized to receive pins 38 when the collar is in the open position. The ring 30 also has a plurality of arcuate recesses 45 located on the same diameter as pins 38 which serve as detent means for yieldably holding the collar in the locking position.

Figure 5:
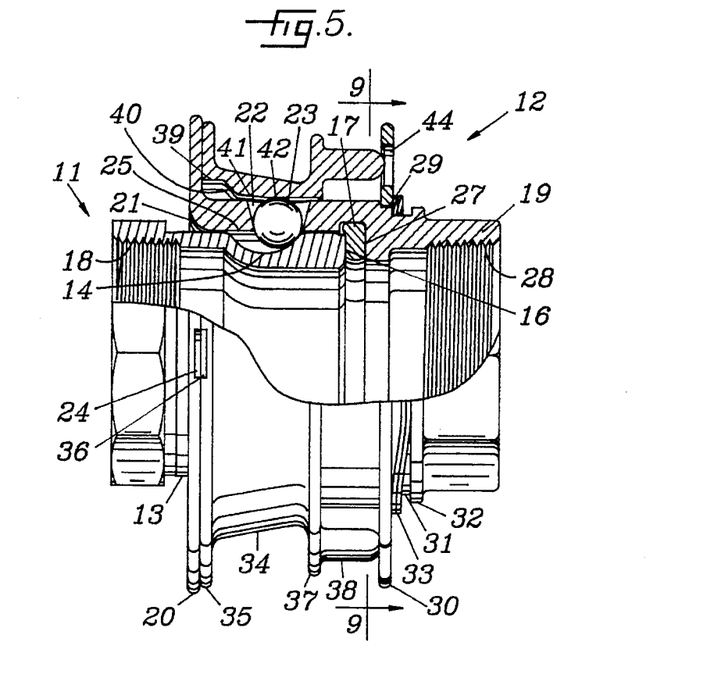
FIG. 5 is a view similar to FIG. 4 showing the locking collar in the fully extended position with the spherical members having drawn the end surface of the male coupling member into a position of full compression against the sealing ring.
Figure 6:
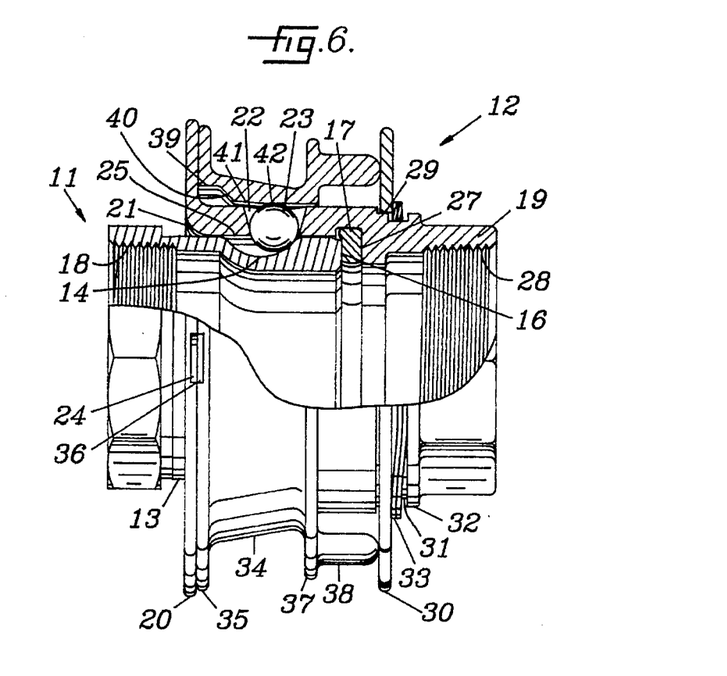
FIG. 6 is a view similar to FIG. 5 showing the locking collar and safety ring relatively rotated from the position of FIG. 5.
Figure 7:
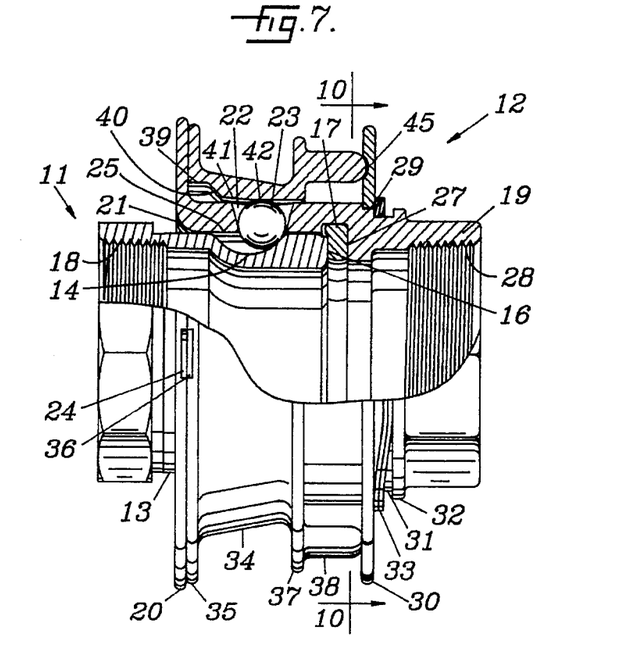
FIG. 7 is a view similar to FIG. 6 in which the locking collar has been rotated fully to a detent position.
Figure 8:
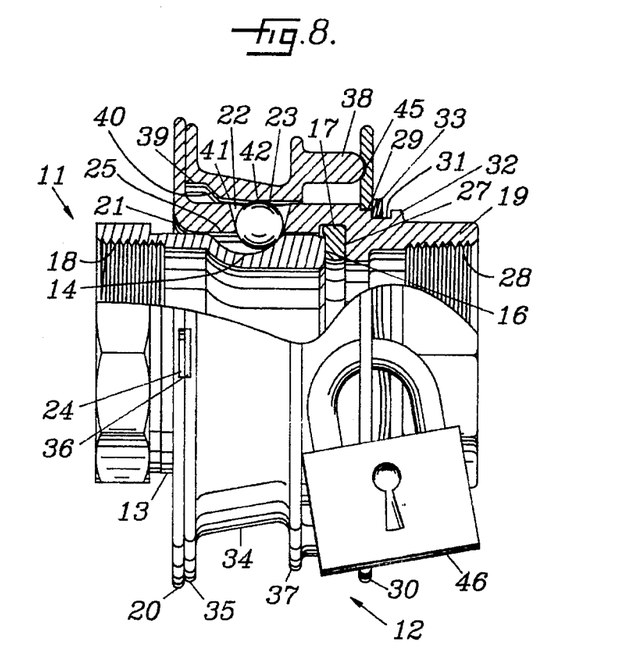
FIG. 8 is a view showing a means for effecting locking of the coupling in the interconnected position.

According to the illustrative embodiment, once the collar is shifted to the locking position in which the pins 38 are out of the openings 44, as illustrated in FIGS. 5 and 6, the ring 30 is then rotated relative to the collar until the detent position of FIGS. 7 and 8 is reached. In this position, pins 38 are within the arcuate recesses, and the collar is yieldably held in the locked position under the influence of spring 33. Release of the collar is effected by rotation of ring 30 back to a position in which the pins 38 are in registry with openings 44 and then moving the collar in the reverse direction into the position of FIGS. 1–3 in which the pins have been passed through the openings.

According to the preferred form of the invention, means are provided for locking the collar in the connected position of the coupling. This is accomplished simply by inserting a locking device, such as a padlock 46, through either of the openings 44. With the padlock in place, the collar is prevented from being moved to the open position since the pins 38 cannot pass through the openings 44. It will be apparent that use of the locking device to prevent movement of the collar to the open position, the coupling is effectively locked against use.

Recesses 24 and 36 allow access by a screwdriver or other prying tool to separate the parts should they become frozen together. Preferably, the collar is free to turn on the cylindrical outer surface of the female coupling element, thereby facilitating cleaning prior to use.

In summary, the operation of the coupling is as follows.

In the initial position where the male and female coupling members 11 and 12 are separated, the parts are disposed as illustrated in FIGS. 1 and 9. The safety ring 30 is in the position in which pins 38 extend through openings 44 (see FIG. 9), and the collar flange 37 rests against the forwardly facing surface of the ring. The female coupling member 12 is fitted over the male coupler 11, as shown in FIG. 2. The tapered surface 15 on the open end of male coupler member 11 lifts the spheres 23 into the relatively large recess of the collar 34 allowing relative movement of the end of the male coupler member to move past the spheres 23 until the parts are in the position shown in FIG. 3. In accomplishing this, it should be noted that the forces applied by the worker to the female coupling member in effecting the interfitting of the parts is directed towards the left, as viewed in this figure. In this position, the male coupler face 16 bears against the gasket 17, as may be seen in FIG. 3. With the parts in this position, the worker presses the collar 34 to the left, as viewed in the figures, from the position of FIG. 3 to the position of FIG. 4. Further, movement of the collar 34 continues to force the balls 23 further inwardly by the interaction of the gradually sloped camming surface 41 camming the male coupling member towards the right, as viewed in the figures effecting a seal between the face 16 of the male coupling member and the seal 17 which is in turn compressed against the backup sealing surface 27. Just prior to movement of the collar to its full extent against the facing surface of flange 20, the reverse slope of camming surface portion 42 releases the force on the balls 23 slightly, thereby allowing a slight compressive relaxation of the gasket. This interaction maintains a positive tension on the collar 34 which is effective to keep it pressing against the flange 20 and the coupling tightly sealed, as is illustrated in FIG. 5. Since all parts of the collar are of smaller diameter than flange 20 and safety ring 30, the collar is protected and the likelihood of opening of a coupling by accidental contact is reduced during use.

Nevertheless, to provide further assurance against accidental opening of the coupling, means are provided for turning the ring 30 to a detent position in which a detent force is applied to maintain the parts in coupled position. In the preferred form of the invention, ring 30 is rotatable to a position in which safety pins 38 rest within the arcuate recesses 45 so that the collar cannot return to the retracted position, except upon a deliberate turning of the ring, as should be clear from reference to FIGS. 7–10. To provide tamper resistance, a standard padlock 46 or other locking devices may be placed in one or the other of the openings 44, thereby assuring that the pins 38 cannot be passed through them.

It is within the scope of the invention to provide a dust plug device like male coupling member 11 with the exception that one end is closed. With the use of a dust plug and the locking means described above, pilferage of product may be avoided. Likewise, the female coupling member 12 may be provided in the form of a dust cap or plug by sealing the opening 28 and using a locking device applied in the manner described above.

Disconnection of the coupling is essentially the reverse of coupling. The locking device 46, if employed, is first removed. Safety ring 30 is then turned to the point where openings 44 line up with pins 38. The worker then pulls on ring 37 to move the collar towards the safety ring 30 or squeezes the rings 37 and 30 until the pins pass through the openings 44. The collar is now in the position shown in FIGS. 1–3, and the coupling parts may now be separated.

In interconnecting and effecting the seal of the coupling parts, all forces applied by the worker are applied against the female coupling member and the collar in the same direction. There is a reduction in friction forces since the ball-type camming members rotate in the direction of the forces that draw the parts together. When a seal has been effected, the worker is alerted to the fact by the force applied by the toggle action of the reverse slope of the third camming surface within the collar. The third camming surface further operates to urge the collar against the radial flange 20, thereby reducing the possibility of accidental uncoupling. Maintenance of the parts in the coupled position is further assured by the interaction of pins 38 with the detent recesses in safety ring 30. Finally, the coupling may be made essentially tamper proof by use of a locking means in one of the openings 44.

We claim:

1. A quick action fluid coupling comprising:

male and female coupling members;

said female coupling member having an open end for receiving the male coupling member and a cylindrical wall portion defining a fluid passageway extending axially therethrough, a plurality of circumferentially disposed openings extended through said wall portion, a rotatable spherical camming member loosely retained in each of said openings;

a compressible sealing ring within said passageway on the side of said openings opposite to the open end and a backup shoulder on the side of said sealing ring away from the open end;

an axially moveable collar surrounding the cylindrical wall portion of said female coupling member, said collar being movable between a retracted position and a sealing position, the sealing position being in the direction of said open end, said collar having an internally disposed camming surface portion configured to cam said camming members radially inwardly upon movement of said collar to said sealing position;

said male coupling member being dimensioned to fit within said fluid passageway and having an annular end surface portion adapted to interface with said compressible sealing ring when the male coupling member is inserted into the female coupling member, said male coupling member further having an upwardly open groove circumferentially disposed on its outer periphery, said groove being positioned to receive the camming members and having a camming surface interengaged with the circumferential surface of the camming members when the end surface portion is interfacing with said sealing ring, the internally disposed camming surface portion of said collar being configured to apply a camming force on said camming members effective to hold the camming members in locking relationship with said circumferentially disposed groove and to act on said camming surface of said groove to force said end portion of the male member axially into a sealing relationship with said sealing ring when the axially movable collar is moved to said sealing position;

said camming surface portion of said collar comprising an initial camming surface having a relatively steep slope engageable with said spherical members for moving the spherical members into locking relationship with said circumferentially disposed groove and a second camming surface following the initial camming surface having a relatively gradual slope for forcing said end portion of said male member axially into sealing relationship with said sealing ring, said camming surface portion of said collar further including a third camming surface following said second camming surface, said third camming surface being of relatively gradual slope, the slope of said third camming surface being a reverse slope in relation to the slope of said first and second camming surface, said third camming surface maintaining a compressive force on said gasket sufficient to maintain a seal but being less than the compressive force applied by said second camming surface.

2. A coupling according to claim 1, further including detent means for yieldably maintaining said collar in said sealing position.

3. A coupling according to claim 2, wherein said detent means comprises a ring mounted for axial movement on said female coupling member, and resilient means urging said ring towards said collar for yieldably holding the collar in said sealing position.

4. A coupling according to claim 3, said ring comprises an upstanding flange having a detent recess facing said collar, a projection on said collar, said collar and said ring being relatively rotatable from a first position in which the detent projection and the recess are out of registry and a second position in which the projection yieldably interfits within said recess.

5. A coupling according to claim 4 in which said recess is arcuately shaped.

6. A coupling according to claim 4 in which the ring is the rotatable member.

7. A coupling according to claim 6, wherein said ring and said collar are rotatable.

8. A coupling according to claim 6 in which the collar is axially movable to the retracted position upon rotation of said ring from said second to said first position.

9. A coupling according to claim 8, further including releasable locking means on said ring for selectively blocking movement of said collar to the retractable position.

10. A coupling according to claim 9, wherein said locking means comprises an opening in said upstanding flange, wherein said projection interfits within said opening when the collar is in said retracted position and wherein said releasable locking means within said opening and blocking of movement of the collar to said retracted position.

11. In a fluid coupling assembly comprising hollow male and female coupling elements, said female coupling element having an open end within which the male coupling element is interfitted:

a circumferentially extending recess in the outer periphery of the male coupling element, a plurality of radially facing openings circumferentially disposed in the female coupling element, a locking member loosely supported within each opening;

said locking members being dimensioned to extend through said openings into the recess in the male coupling element when the coupling elements are interfitted;

a locking collar mounted on the female coupling element and being axially movable from a retracted position in which the locking members are free to move out of the recess in the male coupling element and a locking position in which the locking members are maintained in said recess;

a radially projecting safety member, spaced from the open end oppositely to the collar, said safety member being mounted for rotation on the said female coupling element adjacent said locking collar;

an axially extending projection extending from the collar towards the radially projecting safety member, said safety member having an opening extending therethrough in registry with said projection, said projection being movable through said opening to allow movement of the collar to the retracted position and means for rotating said safety member to a position in which the opening is out of registry with the projection on the collar for selectively blocking movement of the collar to the retracted position.

12. In a coupling assembly according to claim 11, further including a locking means selectively inserted within said opening for blocking passage of the projection on the collar through the opening.

13. In a coupling assembly according to claim 12, further including a detent recess in the radially projecting safety member, said detent recess being circumferentially displaced from the opening, the projection on the collar and the detent being equally displaced from the coupling assembly axis, means for rotating the safety member to a position in which the projection interfits with the recess when the collar is in the locking position.

14. A coupling assembly according to claim 13, wherein said detent recess is arcuate and wherein the radius of the arc forming the recess extends from the coupling assembly access.

15. A coupling assembly according to claim 13, further including a compressible sealing ring within said female coupling element disposed on the side of the locking members opposite to the opening, said male coupling element having an end surface portion interfacing with said sealing ring when the locking members are within the recess, said collar having internally disposed camming surface means comprises a first surface portion of relatively steep slope for effecting a relatively large displacement of said locking members into said recess and a second surface portion of relatively gradual slope, said recess having a sloping side wall engaged by said locking members to effect movement of the male coupling element axially to a position in which said end surface portion compresses said sealing ring.

16. A coupling assembly according to claim 15, wherein the internally disposed camming surface means comprises a third surface portion following the second surface portion, said third surface portion having a reverse slope with respect to the first and the second for maintaining the compression on said sealing ring at a decreased level with respect to the compression by said second surface portion when the collar is moved to said locking position.

17. In a coupling assembly according to claim 16, wherein said female coupling element has a radially extending flange at the open end and wherein said third surface portion applies a camming force transmitted through said locking members to urge said locking collar against said flange when the locking collar is in said locking position.

18. A quick action coupling comprising:

male and female coupling members;

said female coupling member having an open end for receiving the male coupling member and a wall portion defining a fluid passageway;

a plurality of openings peripherally disposed about said cylindrical wall portion, a spherical camming member loosely retained within each opening;

a compressible sealing ring within said passageway located on the side of said peripherally disposed openings opposite to said open end;

a collar surrounding the wall portion of said female coupling member, said collar being axially movable from a retracted position to a first position in the direction of said open end and a second position adjacent said open end and having an internally disposed camming means for camming said camming members radially inwardly upon movement of the collar to the first position;

said male coupling member being dimensioned to fit within said passageway and having an upwardly open groove disposed on its outer periphery, said groove having a camming surface engaged by said camming members when the collar is in said first position; and said camming members being effective to apply a camming force on the camming surface of said groove sufficient to shift said male coupling member axially into a sealing relationship with said compressible sealing ring upon movement of the collar to said second position, the internally disposed camming means comprising a relatively steep sloped camming portion engageable with said spherical camming members as the collar is moved to said first position, a relatively gradually sloped portion engaging said spheres following the relatively steep sloped portion and a reverse sloped portion following the gradually sloped portion, said reverse sloped portion engaging the spheres as the collar is moved from said first position to said second position.

* * * * *